United States Patent Office 2,698,868
Patented Jan. 4, 1955

2,698,868

PROCESS FOR THE PRODUCTION OF UNSATURATED PHENOLIC COMPOUNDS

Edward Michael Evans, Tonbridge, England, and John Edward Seager Whitney, Penarth, Wales No Drawing. Application June 24, 1950,
Serial No. 170,268

10 Claims. (Cl. 260—624)

The present invention relates to the production of phenols containing at least one alkyl substituent in which an ethylenic double bond occurs in the alpha-beta position, and also to the production of ethers of such phenols.

It has been found that a phenol or phenols having at least one aliphatic hydrocarbon substituent of at least three carbon atoms and up to twenty-eight carbon atoms in chain length and in which the two adjacent carbon atoms nearest the aromatic nucleus are each attached to at least one hydrogen atom, for example, alkyl phenols, may be cracked in the vapour phase, whereby this substituent is converted into one having an ethylenic double bond in the alpha-beta position. The cracking is preferably effected in the presence of a catalyst, particularly one of the type known for the dehydrogenation of ethyl benzene, such as those described in British Patent No. 340,587, and at a temperature in the range 400 to 800° C. in the presence or absence of a gaseous diluent such as steam, hydrogen, benzene-vapour, nitrogen or carbon dioxide at atmospheric or higher or lower pressure. Even where no catalyst is employed it is preferred to have solid contact material present to facilitate heat transfer, and the presence of steam is advantageous as it assists in the removal of carbon by the water-gas reaction. Short contact times are preferred, these naturally being reduced as the pyrolysis temperature is increased; for example, at 400° C. best results are obtained if the contact time does not exceed 1 second, while at 800° C. the corresponding maximum time is 0.1 second and may be as low as 0.01 second. The preferred operating temperatures are in the range 500–700° C.

It will be understood that the substituent of 3 to 28 carbon atoms will be cracked on pyrolysis to give a chain or chains of shorter length and simultaneously dehydrogenated with resultant formation of one or more ethenoid groups, and the process has application to the production of vinyl phenols from substituted phenols, and vinyl phenol ethers from the corresponding etherified starting materials. In particular, this invention is applicable to the production of meta vinyl phenol from cashew nut shell liquid or its components or distillates, including cardanol, or hydrogenated phenolic derivatives, and to the production of meta vinyl phenol ethers from the corresponding etherified starting material. Where the initial material contains a carboxylic acid substituent as in the case of anacardic acid, decarboxylation may be allowed to proceed simultaneously with the desired decomposition and the carbon dioxide evolved may be allowed to function as the whole or part of the diluent. Polymers may also be employed, depolymerisation taking place at the operating temperatures. As is usual in cracking operations, the products may not all be of the same type and, in many cases, valuable non-phenolic material will be formed as a recoverable by-product.

Where the starting material is etherified, as with the alkyl and aryl phenol ethers, the dehydrogenation product will normally contain the corresponding ether of the vinyl phenol. However, dehydrogenation, cracking and/or wandering of the ether radical to the benzene nucleus may also take place, particularly with the aliphatic phenol ethers, and the product will generally be more complex than that formed from the free phenol.

The recovery of the valuable lower phenols from the reaction product is generally effected by separating the phenolic from the non-phenolic components by extraction and the higher boiling from the lower boiling components by distillation or fractionation and it is preferable to conduct the latter operation first, as the higher boiling phenols frequently promote emulsification during the extraction step. The final separation of the vinyl phenols may be effected by fractionation. In some cases acidic material may contaminate the phenol fraction isolated by alkali extraction and it may be advantageous to separate the phenols selectively from the extract by precipitation with carbon dioxide instead of by a stronger acid.

The following examples illustrate various embodiments of this invention, the parts referred to being by weight:

*Example 1*

1,600 grams of cardanol, which had been obtained by vacuum distillation of crude cashew nut shell liquid, was vaporised by allowing it to flow at a rate of 94 grams per hour into a heated vessel through which steam, super heated to the temperature of 360° C., passed at a rate of 110 grams per hour. The combined vapours were then passed through a silica tube of 12 mm. internal diameter, surrounded for a length of 9 inches by a lagged nickel-chromium coil, to provide electrical heating, this portion of the tube being packed with 10 grams of activated alumina in the form of irregularly shaped pellets having maximum diameters varying between 3 and 5 mm. Immediately beyond the packed zone a thermocouple was inserted into the tube, and the current through the heating coil was adjusted to maintain a mean temperature of 580° C. These conditions correspond to an approximate mean molecular contact time of 0.146 second and a ratio of 22 molecules of steam to 1 of cardanol.

On emerging from the heated zone, the vapours were rapidly condensed and the mist which was formed at this stage was trapped by directing the vapour emerging from the condenser through an impinger, the material collected in this manner being added to the non-aqueous portion of the condensate after its separation from the condensed steam to give a total recovery of 977 grams of non-aqueous material consisting mainly of unsaturated phenolic and non-phenolic compunds.

The lower phenols and the more volatile non-phenolic constituents were separated from this mixture by distilling up to a temperature of 150° C. and down to a pressure of 5 mm. mercury, 380 grams of low boiling material being recovered. Complete separation of the phenols contained in this portion was effected by the addition of 50 grams of sodium hydroxide and 500 grams of water. 84 grams of non-phenolic material formed an upper layer and were separated and the aqueous layer was then completely freed from coloured, non-phenolic impurities by six successive extractions with 100 gram portions of benzene. The phenols were separated by neutralisation with 15% weight-volume hydrochloric acid solution, followed immediately by the addition of excess sodium bicarbonate. After separation of the water and salts the phenols were substantially dried by the addition of anhydrous magnesium sulphate and fractionally distilled at a pressure of 15 mm. of mercury, using a Vigreux column of 4 ft. effective length and fitted with a reflux return to yield 110 grams of crude (approximately 75%) meta vinyl phenol having a boiling range 110 to 115° C. under 15 mm. mercury pressure and a refractive index $N_{15}^D$ 1.576. This meta vinyl phenol was colourless and polymerised readily in the absence of a catalyst at room temperature, it being advisable to add a stabiliser such as metol to the distillation receiver.

*Example 2*

5 kilograms of cardanol, obtained by the vacuum distillation of cashew nut shell liquid which had been substantially freed from mineral and protein material by washing with dilute sulphuric acid, was mixed with an equal weight of distillation residues from previous pyrolysis batches and continuously vaporised at the rate of 350 grams per hour in the presence of 800 grams per hour of superheated steam at a temperature of 360° C. The combined vapours were passed through an electrically heated converted of 100 ml. effective capacity, packed with a catalyst consisting of granular absorbent alumina on which had been deposited 10% by weight of calcium oxide, and the heating was adjusted to maintain the emergent vapour temperature at 600° C. throughout the run. The vapours on emerging from the converter were rapidly cooled and condensed, and the non-aqueous layer of the condensate, to which was added the contents of an impinger which had been introduced into the system in order to retain smoke particles, amounted to 6½ kilograms. This product was distilled batchwise, using Vigreux column, and the following cuts were taken.

*Cut 1.*—1 kilogram, boiling below 60° C. at 20 mm. mercury pressure, consisting predominantly of a mixture of water and hydrocarbons.

*Cut 2.*—2 kilograms, boiling range 60–180° C. at 20 mm. mercury pressure.

*Residue.*—3½ kilograms.

Cut 2 was then treated with 4 kilograms of 16% sodium hydroxide solution which caused the separation of 400 grams of hydrocarbon material during 12 hours and a further 300 grams were removed by countercurrent extraction of the aqueous layer with a mixture of benzene and petroleum ether. The lower boiling phenols were then precipitated by means of carbon dioxide, washed free from organic acidic matter, dehydrated by means of flash evaporation and fractionally distilled. The phenols were thereby found to consist of:

2½% of phenol
7½% of metacresol
10½% of meta ethyl phenol
40% of meta vinyl phenol
40% of higher-boiling residue.

Example 3

900 grams of cardanyl methyl ether were vaporised at the rate of 190 grams per hour in the presence of 350 grams per hour of super-heated steam at 350° C., and the combined vapours were passed through an electrically heated converter of 30 ml. effective capacity packed with a catalyst prepared by depositing 5.3% of sodium vanadate on granular magnesite, the heating being adjusted to maintain an emergent vapour temperature of 650° C. The emergent vapours were rapidly cooled and condensed, and 440 grams of non-aqueous matter were separated from the condensate and fractionated. The non-aqueous fraction of the condensate was thus found to contain:

80 grams of water and volatile hydrocarbons, boiling below 60° C. at 2.8 mm. mercury pressure.
92 grams of material boiling at 60–75° C. at 2.8 mm. mercury pressure containing meta methoxy styrene.
70 grams of material boiling at 75–85° C. at 2.8 mm. mercury pressure containing approximately 60% of meta-vinyl phenol.

Example 4

550 grams of normal hexyl phenol were vaporised at the rate of 183 grams per hour in the presence of 1,200 grams per hour of super-heated steam at 360° C., the combined vapours were passed through an electrically heated converter packed with catalyst as described in the previous example, and the heating was maintained to give an emergent vapour temperature of 580° C. The vapours were then rapidly cooled and condensed, 380 grams of non-aqueous material being obtained in the condensate from which 55 grams of volatile hydrocarbons, 60 grams of crude phenols and hydrocarbons boiling at 60–145° C. at 20 mm. mercury pressure and 175 grams of crude para-vinyl phenol of boiling range 145–152° C. at 20 mm. mercury pressure were obtained by fractional distillation. The crude para-vinyl phenol polymerised spontaneously in the condenser and receiver.

In accordance with normal cracking and dehydrogenation processes, portions of the products from previous runs may be recycled to the fresh materials to be pyrolysed in carrying out the process of this invention.

While this invention has been exemplified only with respect to individual phenols and phenol ethers, mixtures of these materials such as the higher alkyl phenol fractions of coal tar, may be used in substantially the same manner.

We claim:

1. A process which comprises cracking a phenolic material having at least one nuclear aliphatic hydrocarbon substituent of 3 to 28 carbon atoms, in which the two carbon atoms nearest the aromatic nucleus are attached to at least one hydrogen atom, in the vapour phase, at 500–700° C. and in the presence of a dehydrogenation catalyst to convert the substituent to one having an ethylenic double bond in the alpha-beta position.

2. A process for the production of a vinyl phenolic material which comprises cracking a phenolic material having at least one nuclear aliphatic hydrocarbon substituent of 3 to 28 carbon atoms in which the two carbon atoms nearest the aromatic nucleus are each attached to at least one hydrogen atom, in the vapour phase, at 500–700° C. and in the presence of a dehydrogenation catalyst and isolating the vinyl phenolic material formed.

3. A process which comprises cracking a phenolic material having at least one nuclear aliphatic hydrocarbon substituent of 3–28 carbon atoms, in which the two carbon atoms nearest the aromatic nucleus are attached to at least one hydrogen atom, in the vapour phase, at 500–700° C. and in the presence of a dehydrogenation catalyst to convert the substituent to one having an ethylenic double bond in the alpha-beta position, said phenolic material being selected from the group consisting of the phenolic constituents of cashew nut shell liquid, the hydrogenated constituents of cashew nut shell liquid and the hydrocarbon ethers of the constituents of cashew nut shell liquid.

4. A process for the production of a vinyl phenolic material which comprises cracking a phenolic material having at least one nuclear aliphatic hydrocarbon substituent of 3–28 carbon atoms in which the two carbon atoms nearest the aromatic nucleus are each attached to at least one hydrogen atom, in the vapour phase, at 50–700° C. and in the presence of a dehydrogenation catalyst and isolating the vinyl phenolic material formed, said phenolic material being cracked being selected from the group consisting of the phenolic constituents of cashew nut shell liquid, the hydrogenated constituents of cashew nut shell liquid and the hydrocarbon ethers of the constituents of cashew nut shell liquid.

5. A process which comprises cracking a phenolic material having at least one nuclear aliphatic hydrocarbon substituent of 3–28 carbon atoms, in which the two carbon atoms nearest the aromatic nucleus are attached to at least one hydrogen atom, in the vapour phase, and in contact with a dehydrogenation catalyst to convert the substituent to one having an ethylenic double bond in the alpha-beta position in which process the cracking is effected at a temperature of 400° C.–800° C. and the contact time employed is from one (1) second to one one-hundredth (0.01) of a second.

6. A process which comprises cracking a phenolic material having at least one nuclear aliphatic hydrocarbon substituent of 3–28 carbon atoms, in which the two carbon atoms nearest the aromatic nucleus are attached to at least one hydrogen atom, in the vapour phase, to convert the substituent to one having an ethylenic double bond in the alpha-beta position in which process the cracking is effected at 500–700° C. in the presence of a catalyst of the type known to be suitable for the dehydrogenation of ethyl benzene.

7. A process which comprises cracking a phenolic material having at least one nuclear aliphatic hydrocarbon substituent of 3–28 carbon atoms, in which the two carbon atoms nearest the aromatic nucleus are attached to at least one hydrogen atom, in the vapour phase, to convert the substituent to one having an ethylenic double bond in the alpha-beta position in which process the cracking is effected at a temperature of 400° C.–800° C. and the contact time employed is from one (1) second to one one-hundredth (0.01) of a second and in which process the cracking is effected in the presence of a gaseous diluent which is inert under the conditions of the process hereinabove described.

8. A process which comprises cracking a phenolic material having at least one nuclear aliphatic hydrocarbon substituent of 3–28 carbon atoms, in which the two carbon atoms nearest the aromatic nucleus are attached to at least one hydrogen atom, in the vapour phase, to convert the substituent to one having an ethylenic double bond in the alpha-beta position in which process the cracking is effected at a temperature of 400° C.–800° C. and the contact time employed is from one (1) second to one one-hundredth (0.01) of a second, and in which the cracking is effected in the presence of a catalyst of the type known to be suitable for the dehydrogenation of ethyl benzene and in the presence of a gaseous diluent which is inert under the conditions hereinabove described in this claim.

9. A process which comprises cracking a phenolic material having at least one nuclear aliphatic hydrocarbon substituent of 3–28 carbon atoms, in which the two carbon atoms nearest the aromatic nucleus are attached to at least one hydrogen atom, in the vapour phase, at 500–700° C. and in the presence of a dehydrogenation catalyst to convert the substituent to one having an ethylenic double bond in the alpha-beta position in which process low boiling phenolic material is recovered from the reaction mass by fractional distillation followed by alkali extraction.

10. The process of claim 9, in which vinyl phenols are recovered from the alkali extract by contact with carbon dioxide, followed by fractional distillation.

References Cited in the file of this patent

UNITED STATES PATENTS

| | | |
|---|---|---|
| 1,950,085 | Harvey | Mar. 6, 1934 |
| 2,016,282 | Harvey | Oct. 8, 1935 |
| 2,098,824 | Harvey | Nov. 9, 1937 |
| 2,218,531 | Harvey | Oct. 22, 1940 |

OTHER REFERENCES

Sachanen—Conversion of Petroleum (1940), Reinhold Publ. Corp., New York, pages 174–5.

Thomas et al., Jour. Am. Chem. Soc., vol. 66, pages 1694–6 (1944).